United States Patent [19]

Ball

[11] 4,017,767
[45] Apr. 12, 1977

[54] LASER LIGHTNING ROD SYSTEM

[76] Inventor: Leonard M. Ball, Rte. 4, Box 319-U, Eugene, Oreg. 97405

[22] Filed: Dec. 10, 1973

[21] Appl. No.: 423,239

[52] U.S. Cl. .............................. 361/117; 315/36; 307/149; 315/149; 331/DIG. 1
[51] Int. Cl.² ........................................ H02H 3/22
[58] Field of Search .............. 317/61; 315/36, 149, 315/150, 151, 152, 153, 154, 155, 156, 157, 158; 331/94.5 A, 94.5 Q, 94.5 C; 307/149

[56] References Cited
UNITED STATES PATENTS

| | | | |
|---|---|---|---|
| 3,584,260 | 6/1971 | Barbini | 307/149 X |
| 3,719,829 | 3/1973 | Vaill | 307/149 |
| 3,760,295 | 9/1973 | Lankard et al. | 331/94.5 Q |
| 3,768,036 | 10/1973 | Witteman et al. | 331/94.5 C |
| 3,775,638 | 11/1973 | Tidman | 307/149 X |

Primary Examiner—R. Skudy
Assistant Examiner—Patrick R. Salce
Attorney, Agent, or Firm—Chernoff & Vilhauer

[57] ABSTRACT

A system utilizing ionization produced by beams from laser and laser-like devices to pre-determine the course of stepped leader and lightning channel development, thereby affording protection of life and property. The applications of such a capacity to harmlessly discharge thunderclouds include forest fire prevention, protection of aircraft, protection of missiles and spacecraft (particularly at time of launch), protection of electric power transmission and distribution networks, protection of communication networks, and (to the extent that Vonnegut's electrical theory of tornadoes may be valid) reduction of the destructive force of tornadoes.

9 Claims, 4 Drawing Figures

LASER LIGHTNING ROD SYSTEM

REFERENCES TO SUPPORTING DISCLOSURE DOCUMENTS

Under the U.S. Patent Office "Disclosure Documents Program" the inventor has previously submitted the following invention disclosure documents in support of the present application:

1. No. 10,574, 4 May 1972, L. M. Ball, *Laser Lightning Rod*
2. No. 15,536, 18 Dec. 1972, L. M. Ball, *Thunderstorm Domestication: The Laser Lightning Rod*. Effective 15 Jan. 1973, L. M. Ball was assigned Class A Copyright Registration Number 397941 for this document, retroactive to 15 Dec. 1972. Two copies have been on file in the Copyright Office since the date of assignment. The entirety of this document (some 102 pages in all) is hereby incorporated by reference.

The inventor hereby requests that both of these invention disclosure documents be indefinitely preserved, and not destroyed on their respective 2nd anniversary dates.

BACKGROUND OF THE INVENTION

The possibility of using a laser beam as a lightning rod, or to "invite" lightning strikes from thunderclouds, was investigated by L. M. Ball in 1964. Lightning "invitation" by other methods had previously been considered by M. Brook, et al., "Artificial Invitation of Lightning Discharges, "*Journal of Geophysical Research*, Vol. 63, No. 11, Nov. 1961, pp. 3967–3968, which is hereby incorporated by reference. On the basis of anticipated advances in the state of the laser art as forseen from the viewpoint of that time, and the erroneous assumption that collisional ionization was required within the laser beam, it was erroneously concluded that the laser lightning rod was impractical. Correspondence from that time related to this early investigation is included in U.S. Patent Office Invention Disclosure Document No. 10,574, 4 May 1972, by L. M. Ball, submitted approximately 8 years after the early investigation under the recently established U.S. Patent Office Disclosure Document Program.

Unforseen advances in the state of the laser art, improved theoretical understanding of the necessary processes, and outcomes of certain key experiments all serve to reverse the former conclusion. The laser lightning rod must now be regarded as a physically realizable device. One possible embodiment of a laser lightning rod is mentioned, but not claimed, in U.S. Pat. No. 3,719,829, by Jack Roy Vaill, dated 6 Mar. 1973, which is hereby incorporated by reference. The Vaill patent is based upon experiments which have been described by Koopman & Wilkerson, "Channeling of an Ionizing Electrical Streamer by a Laser Beam", *Journal of Applied Physics*, Vol. 42, No. 5, April 1971, pp. 1883–1886, which is hereby incorporated by reference. These experiments were incorrectly performed, and their outcomes erroneously interpreted, leading to the false conclusion that excessively high concentrations of ionization would be required in the laser beams. The embodiment described, but not claimed, in the Vaill patent relates specifically to a scheme for combining the beams of lasers of two distinct types for the purpose of achieving such excessively high concentrations of ionization via collisional processes. The Vaill patent, as it relates to the present application for patent, is therefore extremely narrow in scope. A further deficiency of the embodiment mentioned in the Vaill patent is that the lasers used are not adequately protected from damage by the lightning strikes they might intercept.

Those unfamiliar with the language of lightning literature may find a few definitions to be helpful. A cumulonimbus cloud or thundercloud may contain one or more thunderstorm cells, which are regions containing both updrafts and downdrafts and which tend not to mix with adjacent cells. Such a cell may be a source of rain, hail, or lightning, and may have a lifetime of many minutes before dissipating, after which new cells usually develop nearby. Lightning strikes to the ground are preceeded by things called stepped leaders, which are faintly luminous fingers of ionization which propagate in a stepwise fashion from cloud to ground. The steps may range from a few to hundreds of meters in length, with pauses of several microseconds between steps. When the stepped leader reaches the ground, a return stroke (a highly luminous region of intense ionization) propagates upward from ground to cloud along the path previously followed by the stepped leader. A lightning channel is thereby established. Lightning channel currents can be as large as 500,000 Amperes, resulting in explosive heating and expansion of channel gases. This expansion is the origin of thunder. A distinction is customarily made between a stroke and a flash. A flash is what is perceived by eye and brain, and it may be composed of up to 26 separate strokes, or current surges as detected with high speed measuring devices, all in the same spark channel. Usually there are only three or four strokes per flash, and sometimes only one. If, for any reason, the time separation of strokes becomes large enough to allow the channel core temperature to fall below and about 2000° K, (and the free electron concentration to fall below some corresponding value) a new channel may form (preceded by a new stepped leader) along a path different from the old. A lightning flash may be resolved into much more complex structure than we describe here, involving a leader of another type, but the essential fact is that the stepped leader always precedes and determines the path ultimately followed by the lightning channel. For further details see Martin. A. Uman's book *Lightning*, McGraw-Hill, 1969, which is hereby incorporated by reference

SUMMARY OF THE PRESENT INVENTION

In what follows considerable factual information is presented with only the bare minimum of documentation. Most of this information can also be found in L. M. Ball's *Thunderstorm Domestication: The Laser Lightning Rod*, Class A Copyright Registration Number 397941 for 15 Dec. 1972, which is hereby incorporated by reference. Two copies of this publication have been on file with the Copyright Office since 15 Jan. 1973. This publication, some 102 pages in length, is very extensively documented, and readers concerned with the accuracy of unfamiliar factual detail presented here are urged to consult said publication. In it will be found many key arguments, derivations, and numerical results not repeated here. While it contains a few minor errors, these are utterly inconsequential.

The tortuosity or crookedness of lightning channels as evidenced in photographs can only be explained if the direction of stepped leader advance, within each step, is a compromise between the electric field direction and the direction in which free electron density is locally (for the first few meters or tens of meters of air ahead) maximum. Negative ions, because of their large mass, are unimportant. Evidence in support of the view that free electron concentration is far more important than electric field direction is overwhelming. The laser lightning rod system predetermines the course of stepped leader development by drastically perturbing (increasing) the concentration of atmospheric free electrons along a suitable laser beam, thus offering an irresistible path for stepped leader development. Hereinafter "laser beam" shall be defined to include a path followed by one or more laser pulses, and will not be restricted to continuous wave lasers.

The primary process by which free electrons are produced in the laser beam is multiphoton or field ionization. While the traditional photoelectric effect cannot occur if the photon energy is less than the ionization potential (photoelectric threshold energy), there is a significant probability in the very high photon fluxes found in laser beams that two or more photons may combine their energies to accomplish an ionization. An alternative but equivalent description of the process is that the optical electric fields in laser beams, computed from the beam irradiances via Poynting's Theorem, are so large as to polarize atoms or molecules until they come apart. Multiphoton ionization is thus a quantum mechanical tunneling phenomenon which cannot be explained with classical physics. Following their liberation by multiphoton ionization, free electrons in the laser beam may be accelerated by single-photon-inverse-bremsstrahlung to energies at which further ionization by collision may occur, despite the fact that the amplitude of classical free electron motion in the optical electric field may be orders of magnitude smaller than the electron mean free path.

It is worth emphasizing here that such electron acceleration and further collisional ionization are not necessary for successful operation of the laser lightning rod system, for methods are available whereby the free electron concentration due to direct multiphoton ionization in the laser beam path can be made to approach or exceed the concentrations to be expected in air in heated 2000° K, which will be recognized as the criterion for repeated strokes in a lightning channel. Such a path is therefore much more attractive for stepped leader development than any path normally found in nature. If sufficient free electron concentration can be achieved, a laser pulse fired at a thundercloud (and followed by an ionized wake) can be regarded as an extension of the ground ascending at the speed of light. From the viewpoint of the paper by Brook et al. included by reference above, it is difficult to conceive of a more effective means of lightning "invitation" or (more accurately) provocation. In this way, instead of merely predetermining the path of the stepped leader, it might also be possible to choose the times at which lightning strikes would occur (within limits set by the possibility of natural strikes). In particular, it might be possible to provoke strikes from cloud formations from which natural strikes would otherwise never emerge.

The preferred embodiment of the present invention may change with continuing advances in the laser art, but at the time of this writing (December, 1973) would use a neodymium-glass laser slowly Q-switched and simultaneously mode-locked (probably by the saturable absorber method), with a two-step up-conversion process in nonlinear crystals to produce a beam at the fourth harmonic frequency. The corresponding wavelength is 2650 Angstroms, at which atmospheric transmission is adequate (approximately 22 and 1% to ranges of 1 kilometer and 3 kilometers, respectively). A method of deployment will be described which offers the promise of totally eliminating the threat of property damage by cloud-to-ground strikes to terrain below the cloud base altitude along paths not predetermined. The laser lightning rod system encompasses subsystems for determining and quickly utilizing the best deployment sites, pointing directions, and firing times. It further provides extensive protection of the laser itself from the threat of damage by lightning strikes which the system successfully intercepts.

The present invention recognizes and corrects several errors on which both the Vaill patent (incorporated by reference above) and the paper of Koopman & Wilkerson (incorporated by reference above) are predicated. It was a mistake to fire the laser, as Koopman & Wilkerson concede they did, after first firing the Marx generator (which was their high voltage source), for this allowed the development of corona streamers in which the ion concentration was comparable to what would later form the laser beam. Inevitably, the spark channel tended to follow the paths determined by the crooked corona streamers, leading to the false conclusion that excessively high laser powers would be required (powers comparable to what would be needed to produce laser-induced breakdown in the absence of any external high voltage supply) to pre-determine the path of the spark channel. It is now clear that Koopman & Wilkerson should have fired the laser first, that much lower laser powers and beam ion concentrations will suffice, and that a successful laser lightning rod could be based on a laser of a single type. The present invention recognizes that collisional ionization is not needed, recognizes the importance of using short wavelengths to maximize multiphoton ionization rates, recognizes the importance of harmonic admixtures in further increasing multiphoton ionization rates, and further recognizes that laser beam self-extinction phenomena occur too slowly to interfere with laser lightning rod system performance. The specific laser beam self-extinction phenomena to which this remark applies include thermal blooming, avalanche breakdown, plasma resonance reflection, Fresnel reflection from the boundaries of regions of high free electron density, possibly Brillouin scattering, and the peculiar cooling and thermal self-focusing effects (the exact opposite of thermal blooming) sometimes observed in the beams from carbon dioxide lasers (10.6 micron radiation) when propagating in dry air. By the time any of these self-extinction effects sets in, anywhere along the beam, multiphoton ionization will already have proceeded far enough elsewhere in the beam to predetermine the path of stepped leader development.

Most important of all, the present invention recognizes the extreme importance of mode-locking in drastically increasing the rates of multiphoton ionization. A further benefit of mode-locking, in the presently preferred embodiment, is increased efficiency in the up-conversion to the fourth harmonic beam.

DETAILED DESCRIPTION OF THE PREFERRED EMBODIMENTS

The laser lightning rod system consists of four major subsystems: the laser subsystem, the fire control subsystem, the self-protection subsystem, and the deployment subsystem. The laser subsystem, which we first described, can be modified to permit completion of circuits between widely separated sources and loads, even though only a single laser is used.

Figure 1:
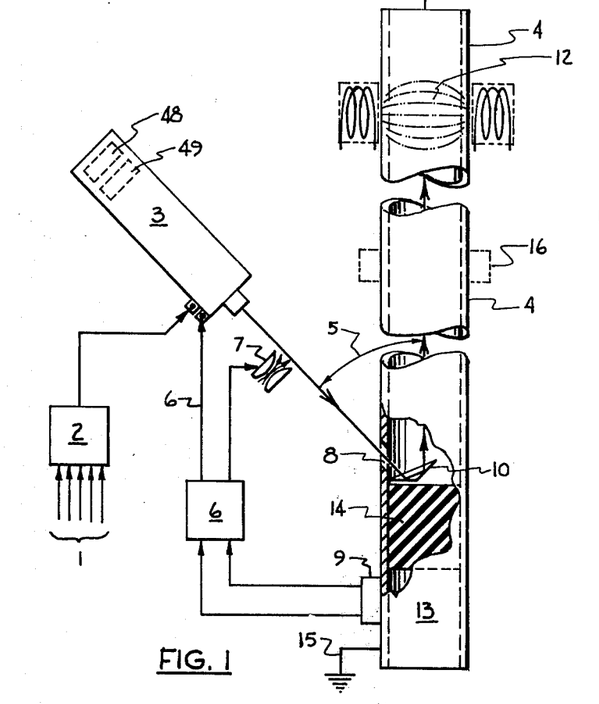
FIG. 1 is a partially schematic side elevation view of an illustrative embodiment of the laser lightning rod, with a portion of the tube broken away for clarity.

The laser subsystem, designated 3 in FIG. 1, includes a laser of a single type, to be chosen from among several possible types. We have already indicated that the choice of laser for what is the preferred embodiment at the time of this writing would be a neodymium glass laser. In connection with possible alternative embodiments, "laser" shall hereinafter be a generic term encompassing tunable systems of dye, a parametric oscillator, Raman, or other types, which might be used to exploit resonances in the multiphoton ionization process. It shall also include "superradiant" or "un-laser" systems, of which pulsed nitrogen is a respective example. The laser might be of the solid, liquid, or gaseous type, and might be used in either CW (continuous wave) or pulsed mode. Such a laser might include travelling wave laser amplifier stages. In the preferred embodiment, a technique popularly known as "double-pulsing" of the flashlamps might be used to pump the laser and/or amplifier stages in minimum time. In the preferred embodiment, the neodymium-glass laser is simultaneously Q-switched and mode-locked, most probably by the saturable absorber method. Either Q-switching or mode-locking might be used separately. Discussions of Q-switching and mode-locking can be found in such standard textbooks as Amnon Yariv's *Introduction to Optical Electronics*, Holt, Rinehart, and Winston, 1971, which is hereby incorporated by reference. Simultaneous Q-switching and mode-locking has been demonstrated by DeMaria, Stetser, and Glenn (see their paper "Ultrashort Light Pulses," *Science*, V156, N3782, 23 June 1967, pp. 1557–1568, which is hereby incorporated by reference. Their FIG. 5 is especially important to the present discussion). Means for Q-switching and/or mode-locking are designated as 48 in our FIG. 1. The preferred embodiment further includes means for fourth harmonic generation in a two-step up-conversion process using two nonlinear crystals. Yariv (pp. 189–197 of the book included by reference above) describes this process and further points out that 100 percent conversion efficiency from fundamental to second harmonic can be achieved in CW laser systems by including the nonlinear crystal within the resonant cavity. While 100 percent conversion efficiency cannot be achieved in pulsed systems, it is advantageous not to Q-switch too rapidly, for the same technique does allow some improvement over more usual 30 percent single pass up-conversion efficiency per step obtained with a crystal external to the cavity. Unfortunately this method can be used only in the first step of the two step process, the second step still being limited to 30 percent efficiency. Motivation for up-conversion to the fourth harmonic is twofold. First of all, up-conversion reduces the required order (number of photons required in coincidence to accomplish ionization) of the multiphoton process, thereby greatly increasing the multiphoton ionization rate. It can further be shown from quantum mechanics that, even if the up-conversion is only partially complete, the presence of even weak harmonic admixtures also serves to significantly increase the ionization rate. Alternative embodiments might employ cadmium vapor in argon, alkali metal vapors, or other media as substitutes for the nonlinear crystals, and it might become possible at some future time to accomplish up-conversion to the desired harmonic in a single step. Means for harmonic generation are designated 49 in FIG. 1.

Preliminary calculations indicate that a variety of other laser types, including carbon dioxide (10.6 microns), pulsed nitrogen (3371 Angstroms), tunable dye, and others may become important in future alternative embodiments.

The extreme importance of mode-locking in increasing the rate of multiphoton ionization is not yet widely recognized, and merits further explanation here. We consider the situation shown in the oscillogram of FIG. 5 in the paper of DeMaria, Stetser, and Glenn, included above by reference, wherein the laser is simultaneously mode-locked and Q-switched. The effect of mode-locking is to divide the Q-switched pulse into a series of much shorter and more intense pulses. The separation between these pulses is twice the cavity length, and the lenth of each pulse is $2/m$ times the cavity length, where $m$ is the number of modes locked together, and can be as large as 60,000 for the neodymium glass laser. The power within any mode-locked pulse is m times what the power would be in the absence of mode-locking. Since the rate of n-photon ionization depends on the nth-power of the photon flux (which in turn is proportional to the instantaneous laser power) it should be obvious that mode-locking will drastically increase the n-photon ionization rate (for $n$ larger than 1) even in a time average sense which includes the time intervals between mode-locked pulses (within which the power is zero). It is a trivial exercise in elementary calculus, which can be found in L. M. Ball's *Thunderstorm Domestication: The Laser Lightning Rod* (included by reference above), and which will not be repeated here, to show that the factor by which the time-average ionization rate increases is $m^{n-1}$, where $n$ is the process order and m is the number of modes locked together. This number can obviously be enormous, resulting in ion concentrations comparable to what might be found following considerable collisional ionization. Note that the rate of collisional ionization is, to a first approximation, unaffected by mode-locking, since the singlephoton inverse bremsstrahlung process by which the free electrons acquire most of their energy is by definition a single-photon process. Mode-locking therefore allows the liberation of an enormous photoelectron population at time-average laser powers (averaging on the nanosecond time scale typical of Q-switched pulses) orders of magnitude less than the powers required to demonstrate laser-induced breakdown in air. In this connection it is worth noting that the Soviet physicist Akmanov and his colleagues have succeeded in pre-determining the paths of spark channels at powers more than 100 times less than the powers required by Koopman and Wilkerson. This was done merely by up-converting to the fourth harmonic, without mode-locking! See Akmanov, Rivlin, and Shil'-dyaev, "Optically-Initiated Directed Electric Breakdown in A Gas," *JETP Letters*, Vol. 8, 1968, pp. 258-259, which is hereby incorporated by reference. With the added effects of mode-locking, which the Soviets did not attempt in these experiments, the power requirements could be reduced orders of magnitude (several factors of 10) further.

It is appropriate here to indicate what reasonable range requirements for the laser lightning rod are, and what ranges might reasonably be achieved. Analysis of an accidentally provoked lightning strike to a salt water mine explosion plume in Chesapeake Bay, which strike originated from a cloud "which was not exhibiting electrical activity," indicates that the sudden appearance of an ionized path only 0.1 kilometers (100 meters) in length might very well be sufficient, especially if the free electron concentration along the path exceeds that found in air at 2000° K. See George A. Young, *A Lightning Strike of An Underwater Explosion Plume*, NOLTR 61-43, U.S. Naval Ordnance Laboratory, White Oak, Md., 1 Feb. 1962, which is hereby incorporated by reference, especially pages 1 and 18. We may here recall that Akmanov's estimate of the free electron concentration in his fourth harmonic beam was about 6 orders of magnitude higher, corresponding to an air temperature of about 4000° K. An important result taken from page 52 of L. M. Ball's *Thunderstorm Domestication: The Laser Lightning Rod* (*previously included by reference above*) *is that an existing neodymium glass laser, not modelocked, and with a Gaussian spot radius of* 1 cm, can produce a sufficiently powerful fourth harmonic beam in two-step up-conversion (overall efficiency of only 9%) to more than match Akmanov's free electron concentration with the 3-photon process in diatomic nitrogen alone. It is further shown on that same page that most of Akmanov's ionization had to come from minority atmospheric constituents which ionize much more easily than nitrogen, so that this system would produce ionization far in excess of Akmanov's if it were used in ordinary air (impure nitrogen). From pages 311-315 of Siegman's *An Introducton to Lasers And Masers*, McGraw-Hill, 1971, which is hereby incorporated by reference, it follows that a beam of 2650 Angstrom radiation from this laser system could be collimated (in the sense described by Siegman, over two "Rayleigh ranges") over a distance of about 2.4 kilometers in the limit of diffraction limited performance. While approach to this limit may be difficult, the increased ionization rates that would result from mode-locking such a system would clearly allow this range to be far exceeded. By other arguments which will not be presented here, mode-locking also can serve to reduce the risk of damage to the nonlinear crystals. In summary, there is no clear reason to believe that ranges up to 3 kilometers cannot be achieved, and examination of the lightning photographs on pages 43.5 and 45.5 of L. M. Ball's treatise (included by reference above) shows that a laser lightning rod with 3 kilometer range would be an extremely useful instrument. Note that by departing from the collimated condition described by Siegman, weak focusing can be used to approximately compensate for reduced transmission to long distances.

It should be recognized that the above comments about the effect of mode locking on multiphoton ionization rates apply to multiphoton ionization in transparent dielectric solids and liquids, in addition to gases. Thus, in transparent dielectric solids, we are led to expect mode-locked laser beams to produce a presently little-known process described by the self-explanatory but inescapably redundant name "multiphoton photoconductivity," or MPPC. MPPC can occur in transparent dielectrics illuminated by mode-locked laser beams of wavelength much longer than the photoconductive threshold. It can also occur if the laser is not mode-locked, provided the laser power is sufficiently high. Thus the beam path in a dielectric can be rendered highly conductive, while neighboring material remains highly insulative. This is a temporary effect, lasting for as long as the beam is turned on and only slightly thereafter. The effect can occur without damage to the dielectric, since the MPPC electrons occupy only the lowest energy portion of the conduction band of the dielectric, because the single-photon inverse bremsstrahlung process by which electrons acquire sufficient energy to cause damage is not a multiphoton process. MPPC is the reason for the electrical interlocks in the self-protection subsystem, which interlock is designated 6 in FIG. 1, which serves to prevent laser firing while an intercepted lightning strike is in progress. Such an interlock is an absolute necessity, for during laser firing no dielectric barrier can serve as protection from lightning, and the laser itself would almost certainly be destroyed if it were to fire while an intercepted strike was in progress.

MPPC induced by mode-locked lasers could serve to transfer information (in the sense used in communication theory) which might be an electrical signal or optical imagery. In the electrophotography industry, for example, the expensive semiconducting "drums" of Xerox machines could be replaced by dielectric drums on which there has heretofore been no way of electrostatically impressing optical imagery. Similarly, electrical energy could be transmitted through any transparent dielectric medium other than vacuum. Note that while imagery can be transmitted across a vacuum, it can be impressed via MPPC only on a dielectric solid or liquid. Electrostatic energy, in the form of a charge concentration stored deep within a transparent solid dielectric (by an electron accelerator or similar device), could be removed at will by a suitable probing laser beam, probably without damage to the dielectric (if the beam cross section is large enough). Spontaneous discharges from such charged dielectrics are often extremely damaging.

Figures 2, 4, 5:
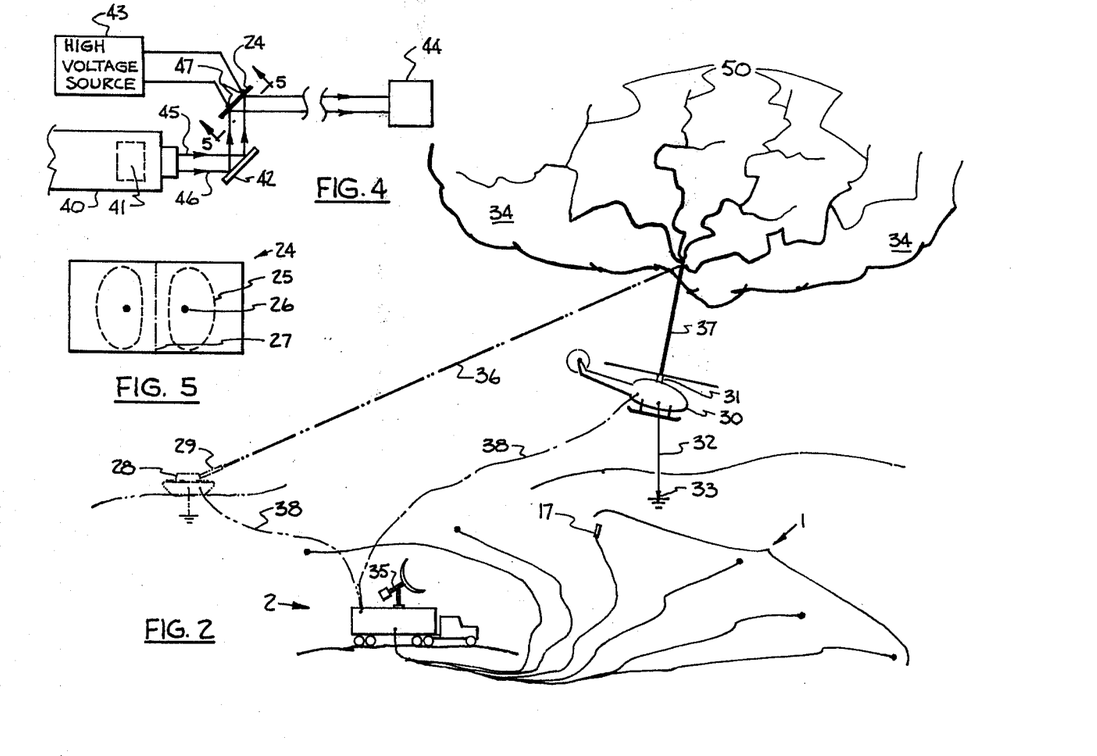
FIG. 2 is a simplified illustration showing two alternative means of deploying the laser lightning rod, and is indicative of the scope of the laser lightning rod system concept.
FIG. 4 is an extended schematic diagram of a multiple-path embodiment of the invention.
FIG. 5 is a view of a mirror for coupling electrical energy to the multiple paths, taken along line 5—5 of FIG. 4.

We next describe a variation of the laser subsystem, a variation which may or may not use mode locking, and which is intended for applications unrelated to lightning. This variation provides for the completion of an electrical circuit via MPPC between a high voltage source and a distant load, and is the subject of FIG. 4 and FIG. 5. Siegman, in his FIGS. 8-23 on page 331 of *An Introduction to Lasers And Masers*, McGraw-Hill, 1971, which is hereby incorporated by reference, shows ten examples of laser higher order transverse mode patterns. If a laser is caused to oscillate in only one of these transverse modes, the corresponding pattern is seen at every cross section of the beam. A laser can be caused to oscillate in one such mode by inserting an obstacle into the cavity which causes all other modes to be lossy. For example, a wire can be stretched across the center of one end of the cavity to produce the modes called $TEM_{01}$ or $TEM_{10}$, which we have tried to depict in FIG. 5. These modes exhibit a nodal line, designated 27, between bright spots (one of which is designated 25) in the mode pattern. The wire would coincide with the nodal line in the pattern at the cross section of the beam containing the wire, and the wire is in fact the cause of the node. The node is in reality a nodal surface which serves to divide the laser beam longitudinally into to separate beams. Higher order transverse modes may divide the laser beam longitudinally into many separate beams which, at sufficiently high laser powers, become separate conducting paths via MPPC in the solid or liquid phase, and via plasma (mostly electron) conduction in the gaseous phase. The lines of maximum beam power, and hence maximum conductivity, for two such paths, designated 45 and 46 in FIG. 4, as would result from operating a laser in either mode $TEM_{01}$ or mode $TEM_{10}$, form the analog of a two conductor transmission line (or household extension cord), with those parts of the dielectric solid or liquid insufficiently illuminated to exhibit MPPC serving the traditional role as insulation. In gases such a transmission line is limited to a transient existence under usual circumstances. These effects are of course accentuated by mode locking the laser, and it should be remembered that operation of a laser in a single transverse mode does not preclude the simultaneous presence of a very large number of longitudinal modes (which are the basis for mode-locking). A minor defect of FIG. 4 and FIG. 5 is that these figures suggest possible intersection of the subdivided beam parts 45 and 46 between the mirrors 24 and 42. Such intersection would result in an unacceptable short circuit, but can easily be avoided by slightly rotating the laser assembly 40 about its optical axis. This would have the effect of moving the point of maximum spot intensity 26 slightly upward or downward in FIG. 5, and its counterpart on the opposite side of the nodal line 27 in the opposite direction, from the positions shown in FIG. 5. A further minor defect of FIG. 5 is that the mode pattern is sketched as it would appear in normal cross section, instead of distended as it would be on the surface of a mirror tilted at 45° to the beam direction.

In FIG. 4, 24 is a special mirror, mostly dielectric, for coupling electrical currents from a high voltage source 43 into the lines of maximum beam conductivity 45 and 46 via small metal electrodes 47 which protrude through the mirror 24 and above its front surface from behind. The electrode tip is at the position designated 26 in FIG. 5 which would be the position of maximum spot intensity of the mode spot in the absence of significant absorption or shadowing by the electrode tip. 40 is a laser assembly (distinct from 3 of FIG. 1) in that it incorporates means 41 for causing the laser to oscillate in a particular transverse mode. 42 is another mirror, all dielectric multilayer in construction, without electrodes, and optional in the sense that the laser assembly 40 could be so positioned so as to make this mirror unnecessary. 44 is a load to which a circuit from the high voltage source 43 is to be completed via the subdivided laser beam. It is important to recognize that there is an alternative embodiment of the apparatus of FIG. 4 in which the positions of the high voltage source 43 and load 44 are interchanged (opposite to what is shown in the figure). Thus 44 might be the transmitter of an electrical signal, and 43 might be a receiver for that signal, or 44 could be an electrical power source, and 43 could be a load. The medium intervening between source and load can be any dielectric other than vacuum. FIG. 5 is another view of the mirror 24, showing the outline of the spots of the $TEM_{01}$ or $TEM_{10}$ transverse mode patterns. The dotted line 25 might represent any specific irradiance contour, for example the "$1/e^2$" irradiance contour. The nodal line 27 is a line of symmetry for this mode pattern.

Finally we should point out that an alternative embodiment of the apparatus of FIg. 4 might use transmission through a specially prepared dielectric plate, instead of reflection from the mirror 24, to accomplish coupling of currents from the source into the beams (or from the beams into the load). Instead of the metallic electrodes 47, films of one of the special electrically conducting glasses (such as is used in aircraft windshield defrosters) might be deposited to form electrodes on the surface of the dielectric plate. If the substrate dielectric were chosen to have a refractive index not greatly different from that of conducting glass electrode films, the plate could be tilted at Brewster's angle, thereby achieving negligible reflection losses in both film and substrate.

We next describe the fire control subsystem, which serves to determine the probable presense of a stepped leader, optimum deployment sites, pointing directions, and laser subsystem firing times. Stepped leader "probable presence", as used hereinafter, shall specifically include the possibility of provoking or inviting lightning strikes prematurely, perhaps from cloud formations from which no lightning strikes would naturally emerge. The fire control subsystem consists of a variety of possible fire control transducers, bearing the symbolic class designation 1 in FIG. 1 and FIG. 2, a central processor (computer) 2 which analyzes data from these transducers and issues deployment instructions and probable presence (firing) signals at appropriate times, and information channels 38 which convey these instructions and signals to elements of the deployment subsystem (surface vehicle 28 or helicopter 30) and to the laser subsystem 3. As we have previously mentioned, the technique of double pulsing allows the preferred embodiment of the laser subsystem to fire very quickly (actually within about 100 microseconds) following receipt of a probable presence signal. The information channels 38 might be radio, microwave, or laser links. Communications between the various fire control transducers and the central processor might include these same three possibilities, in addition to wires or telephone lines.

Fire control transducers include all means by which information useful in assessing the probability of stepped leader presence, in the sense defined above, may be gathered. Such transducers include field mills, and devices of similar function, for monitoring electric fields associated with clouds generally and thunderclouds in particular (see *Science Digest*, October 1973, which is hereby incorporated by reference, pp. 78–83). Long wire antennas, electrically floating, and electrometers or other devices for monitoring antenna potential, might be used. The earliest steps of the stepped leader could be detected by a passive microwave radiometer 35 before emergence from the cloud base. It is also possible that low frequency radio emissions (below 550 kilohertz) might be used to identify the earliest steps of the stepped leader. Radar 35 could be used to keep track of regions of hailstone formation within the thundercloud 34, since the thunderstorm electrification theory of Latham and Mason indicates that hailstone formation and lightning are usually closely associated. A doppler radar 35 could be used to monitor the velocities of hailstones, raindrops, and cloud particles of various sizes, providing information valuable for the computer simulation of thunderstorm cell evolution and accurate lightning prediction. Other transducers which might be useful include lightning flash sensors, thunder sensing microphones, weather balloons, aircraft, and even meteorological satellites. Probably the most important of the fire control transducers is the optical stepped leader detector 17 (FIG. 2 and FIG. 3), which will be described in more detail. The fire control subsystem might include one or more transducers of any of the kinds we have mentioned here, or other kinds as yet unforseen.

The stepped leader signals its presence via microwave emissions, and possibly in other ways, several steps before emergence from the cloud base. There is a high probability, however, that the stepped leader is propagating between charge centers in the cloud, and that it will never emerge from the cloud base. The optical stepped leader detector provides confirmation that the stepped leader has actually emerged from the cloud base (or perhaps become visible between clouds or through a hole in a cloud), and is therefore probably the precursor of a cloud-to-ground strike. Stepped leaders which never emerge from the cloud base may be regarded as "false alarms," and it is not necessarily productive to fire the laser subsystem in response to their presence.

Figure 3:
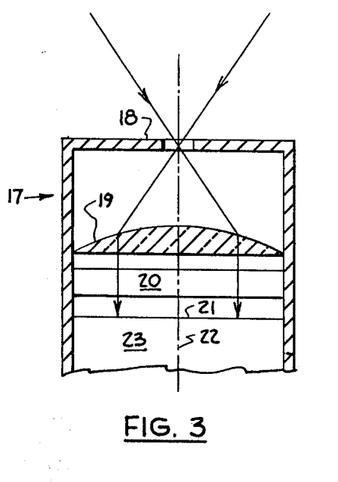
FIG. 3 is a partially sectional side view of an optical stepped leader detector employed as part of the fire control subsystem.

The optical stepped leader detector 17 is more accurately described as a wide-field narrow-band spectral radiometer. It consists of a collimating stop 18 (FIG. 3) located in the front focal plane (surrounding the front focal point) of an objective lens or lens system 19. While a simple plano-asphere is shown in FIG. 3, as should be recognized from the fact that all ray deviation occurs at the upper surface, the system 19 might be as complicated as a photographer's fish-eye lens. 20 is an interference filter designed to transmit the spectrum line due to singly ionized nitrogen at 5680 Angstroms, the Stark-effect broadened 6563 Angstrom red "alpha" line of the Balmer series of atomic hydrogen (present because of the dissociation of water vapor), or perhaps ultraviolet radiation in the interval from 1800 to 2200 Angstroms. Stepped leaders have been detected within this last wavelength interval, in wich background radiation is negligible. Interference filters are the subject of the book *Thin Film Optical Filters*, by H. A. MacLeod, American Elsevier, 1969, which is hereby incorporated by reference. The purpose of the collimating stop 18 is to assure that rays pass through the interference filter at as nearly normal incidence as possible, to avoid the shift of interference filter passband wavelength with angle of incidence. The objective lens images the sky onto the sensitive surface 21 of a photodetector 23 might be a photomultiplier tube, avalanche photodiode, phototransistor, or other device. The sensitive surface 21 might be divided into sectors (as is done with the quadrant photomultipliers used in the startrackers of navigation systems), or be made up of a two dimensional array of detectors, to provide additional information about the location of the stepped leader within the wide field of view. In FIG. 3 the optical axis of the radiometer is designated 22, and would be pointed generally skyward or in the direction of regions of hailstone formation as revealed by radar.

Duties of the central processor, 2 in FIG. 1, might range from simple majority vote fire control decisions ("Yes, stepped leader is present. Yes, emergence from cloud base is confirmed. Yes, issue probable presence signal.") to complete simulation of several thunderstorm cells simultaneously, and the prediction of individual strikes. That strikes can be predicted, and conditions under which strikes might be artificially provoked successfully recognized, is beyond doubt. The question of how elaborate a central processor is required to successfully carry out these tasks must await further experimentation. It is possible that, even with the additional burden of navigational duties, the central processor might be small enough for inclusion in either the surface vehicle 28 or the helicopter 30. Many of the fire control transducers might also be incorporated into either vehicle, thus making the vehicles largely independent of other equipment. For example, a phased array radar could be built into the helicopter blades. Thus FIG. 2 represents only two of many possible embodiments of the overall laser lightning rod system.

Now we turn to the detailed description of the self-protection subsystem. It is clearly necessary to protect the laser subsystem from destruction by lightning strikes which it may intercept or provoke. We have seen above that MPPC (multiphoton photoconductivity) renders dielectric barriers ineffective as protection for lightning during times of actual laser firing and shortly thereafter.

The beam from the laser subsystem 3 (FIG. 1), before beginning its skyward journey, is directed through a well-grounded and thick-walled metallic tube or barrel 4. The walls 4 of the tube must be very strong, and would probably be thicker than FIG. 1 suggests, as they must resist both the crushing pinch effect associated with lightning channel currents of up to 100,000 amperes and the blast effect of explosively expanding lightning channel gases confined within the barrel. Overpressures without confinement have been estimated to as high as 500 atmospheres at a distance of 30 centimeters from the core of the lightning channel. With confinement, they will probably be much higher. While venting might be provided in an attempt to relieve these pressures, it is doubtful that there is sufficient time for venting to be effective, and so the barrel should have the smallest bore that will not disrupt the beam. For the surface vehicle 28 (FIG. 2) to be described later as part of the deployment subsystem, it would be best if the barrel were made of a light metal alloy, to minimize barrel inertia as a beam steering constraint (it may sometimes be desirable to be able to point the beam very quickly from one thunderstorm cel to another). An acute angle bend 5 in the collimated laser beam occurs immediately after the beam passes through the injection port 8 located somewhere near the middle of the barrel's length. The purpose of this bend is to offer inductive reactance to any lightning currents which might attempt to follow the laser beam around the bend to the laser subsystem. From the viewpoint of Fourier analysis, one should expect the current pulses that are lightning strokes to contain considerable high frequency content, and this expectation is vindicated by the powerful radio and microwave emissions from lightning. Because of this high frequency content, lightning currents display a strong preference for paths of minimum inductance. At the bend in the beam the lightning currents are given the choice between a path having negligible inductance (following the tube walls to the bottom end of the tube) and the bent path of the laser beam, which has very high inductance by comparison. Perhaps an acute angle bend is not necessary, but the smaller the angle the higher the inductance. The bend is accomplished in a deflector 10 which in the preferred embodiment would be a TIR (totally internally reflecting) prism, in a series of two reflections. The long face of this prism would probably be modified to provide for Brewster's angle entrance and exit of the beam. The deflecting prism 10 must be supported without contact to the TIR (short) faces. A dielectric plug 14 might be included, both to contribute to deflector support, and to prevent the deflector from being shot out of the bottom of the barrel by blast effects which might occur above it due to the presence of a lightning channel. A dielectric plug is probably preferable to a metallic plug, because it is desirable that the current distribution in the barrel walls be perturbed as little as possible from what they would be in the absence of the plug. For a similar reason, the hole that is the injection port 8 should be no larger than necessary. The remainder 13 of the bottom end of the barrel might be left unused, to allow currents in the barrel walls to pass well beyond the vulnerable laser subsystem before their distribution is perturbed. At the bottom of the barrel, a good ground 15 must be provided. By "good" is meant high conductivity, minimum inductance, and large surface area (because of the skin effect associated with the high frequency content, discussed above, of the lightning currents).

The question of how far down the barrel lightning currents might follow the laser beam before coupling or transferring to the barrel walls is difficult to answer without experimentation. Hopefully this will occur in a tiny fraction of the barrel length. If not, the transfer can be hastened by placing a strong transverse magnetic field 12 across the top end of the barrel. For this to be done effectively it is imperative that at least the top end of the barrel (and preferably all of it) be made of a material that is nonferromagnetic. It would be best if this field were supplied by superconducting magnets. Again because of the skin effect, it would be highly desirable to copper plate the entire external surface 4 of the barrel. Should it turn out that the deflector 10 is frequently damaged by blast effects, further provisions (not shown) can be added to provide for rapid replacement of the deflector. With the addition of two more small ports on opposite sides of the barrel near the normal deflector position, a continuous stream of replacement deflectors could be fed across the barrel, much as ammunition is fed on belts through a machine gun.

A lightning current sensor 9, near the bottom of the barrel, is part of an interlock circuit and information channel 6 which inhibits the laser from firing at times when lightning currents are at dangerously high levels, or stepped leader currents are present, in spite of possibly contrary instructions from the central processor. The interlock circuit could also serve to actuate a transverse hypersonic gas blast or jet (shown as a convergent-divergent nozzle, 7), as is commonly used in circuit breaker technology (see Rieder, "Circuit Breakers," *Scientific American*, V224, N1, January 1971, pp. 76ff, which is hereby incorporated by reference) which cuts through the laser beam path and electrically isolates the laser (which we presume not to be firing) from the barrel. This method is much more effective in discouraging the stepped leader from reaching the laser than in discouraging the later lightning channel currents, and it is important that the jet be triggered early (at low current levels). Alternatively, the predictive capacity of the central processor could be used to trigger it. The jet could also be triggered optically, with a photomultiplier or other detector sensing the emergence of plasma from the injection port 8. Clean dry air or other gas might be continuously discharged from the barrel to prevent entry of hailstones, raindrops, dirt, etc.; and other transverse gas jets could be located in the barrel above the deflector (requiring further opposed pairs of ports) to protect the deflector.

We now describe the deployment subsystem, and how it can be used for maximum effectiveness. It is natural to think of deploying the laser lightning rod on hilltops, and such fixed site deployment may have merit in protecting small regions which may be especially vulnerable to damage by lightning. It should be remembered, however, that clouds are essentially opaque to laser beams, including those from the carbon dioxide laser. The peak of the radius distribution for cloud droplets is near 10 microns, and the laser wavelength must exceed this value by orders of magnitude before cloud penetration becomes significant. Thus the laser lightning rod is useless if fogged in. Fixed sites should be chosen with this in mind, at elevations such that the probability of fog is minimized. To the extent that large scale space charge distributions (mostly molecular ions) tend to conform to the terrain (if winds are not too violent), the laser lightning rod may actually be more effective from low hilltops than high in drawing strikes from the same cloud mass. In the least expensive versions of the preferred embodiment of the laser lightning rod system, in which the central processor might be so simplified as to lack predictive capacity, it is desirable that the deployment altitude be far below the cloud base altitude. This is because about 100 microseconds are required, after confirmation of stepped leader emergence from the cloud base by the optical stepped leader detector, for pumping and firing of the laser. If the cloud base altitude is too near the deployment site (or worse still, too near the ground), a tiny fraction of stepped leaders may be able to reach the ground along uncontrolled paths before the laser can be fired. If the central processor has predictive capacity, however, there is no such problem, and it is accurate to say that the laser lightning rod system can in principle totally eliminate the threat of cloud to ground lightning strikes to terrain below the cloud base altitude and along paths not predetermined. It may be possible for the laser lightning rod to intercept even a few strikes that would otherwise reach the ground at altitudes above the cloud base altitude. Strikes to terrain above the cloud base altitude are not as serious a threat of fire as strikes below, both because of the high humidity and because currents are on the average lower.

From the standpoint of forest fire prevention, deployment at fixed hilltop sites has the serious disadvantage that very large numbers of laser lightning rod systems would be required to offer complete protection to an area as vast, say, as the Willamette National Forest of Oregon. A highly mobile system with the capacity to track a thunderstorm cell throughout its active lifetime, and with the capacity to intercept essentially all cloud to ground strikes which might emerge from the cell, is a much more attractive possibility. It is the purpose of the deployment subsystem to achieve such mobility.

FIG. 2 shows two alternative vehicles suitable for giving mobility to the laser lightning rod system. One of these is a tank-like metal tracked vehicle 28, with only a limited capacity to track and remain beneath active thunderstorm cells, and with the capacity to safely accept strikes at any time whether in motion or not. The tube 4 of FIG. 1 reappears as the structure resembling a turret mounted gun 29 of FIG. 2. The tube can thus be quickly pointed in any desired direction, and it is here that minimized barrel inertia is important. A similar turret mount would be required for permanent hilltop installation. The straight line 36 is indicative of the path that a stepped leader and lightning channel might follow from the thundercloud 34 assuming that the laser subsystem is fired at or before the time at which emergence of the stepped leader from the cloud base is optically confirmed. The central processor, 2, and the information channel 38 can also be regarded as elements of the deployment subsystem.

The preferred embodiment uses a helicopter 30 as the transport vehicle, thus giving the system almost unlimited capacity to track and remain beneath active thunderstorm cells. To avoid blade interference, the preferred embodiment would realize the tube 4 in a hollow main rotor driveshaft 31. Thus the laser beam can only be pointed generally upward, as indicated by the path 37, but this is sufficient since we may assume the helicopter to be beneath the thundercloud. The tube 4 of FIG. 1 might be carried elsewhere in or on the helicopter 30, but a hollow main rotor driveshaft 31 is definitely the best place for it. While intercepting strikes the helicopter would have to hover safely above treetop level (we assume forest too dense or terrain too rugged to prmit the helicopter to land) with grounding accomplished via a cable 32 carried into the earth by a grounding projectile 33 fired to sufficient depth to be safely beyond surfface combustible matter. The cable is maintained straight (taut) while the helicopter is accepting strikes, to minimize inductive reactance.

With only a single injection port 8 (FIG. 1) in the barrel 4, it is obviously impractical to allow the lower portion of the barrel to rotate, as would be required if it also served as the hollow main rotor driveshaft 31 (FIG. 2). The solution of this problem is to divide the barrel 4 into two parts separated by a slip-ring 16 which would probably be of the liquid metal type. The upper part of the barrel would then be free to rotate, while the bottom part would remain fixed. The slip-ring should be designed so as to preserve as nearly undisturbed as possible the current distribution that would prevail if the ring were absent and the barrel continuous. Specifically, inductance associated with the clip ring should be minimized.

Where combustion resistance of the vegetation in the presence of blade downwash is adequate, or where a lake or streambed is available, grounding might be accomplished by a second laser beam directed earthward, instead of by a grounding projectile and cable. The helicopter might also land to accomplish grounding, if terrain permitted. The path 37 is indicative of the course that a stepped leader and lightning channel would almost inevitably take if the helicopter-borne laser subsystem were fired at or before the time at which emergence of the stepped leader from the cloud base is optically confirmed. Stepped leaders 50 within the cloud 34 might be expected to converge at the point where the laser beam 37 is extinguished by the cloud.

Pairs or groups of such helicopters, flown in a horizontal leapfrog pattern (one hovers and accepts strikes while others move to new positions and deploy new grounding projectiles), could easily intercept all cloud-to-ground (below cloud base altitude) strikes from a single thunderstorm cell, an entire thunderstorm, or even a line of thunderstorms.

To the extent that Vonnegut's electrical theory of tornadoes may be valid (see "Electrical Theory of Tornadoes" By Bernard Vonnegut, *Journal of Geophysical Research*, Vol. 65, No. 1, January 1960, pp. 203–212, which is hereby incorporated by reference), and it appears that this theory has never been seriously challenged, the laser lightning rod system might be used to reduce the destructive force of tornadoes. This would be done simply by offering an alternative path to ground for the lightning channel currents which would otherwise heat the tornado core.

What is claimed is:

1. A method of establishing an ionized conductive path of substantial length through air and thereby predetermining the course of a stepped leader and resultant lightning channel, such method comprising:
   a. mode locking a laser;
   b. determining the probable presence of a stepped leader and activating said mode-locked laser to produce a laser beam composed of clusters of photons before said lightning channel is established;
   c. passing the beam produced from said mode-locked laser through said air and establishing by multiphoton ionization an ionization path of sufficient concentration and length to guide said stepped leader toward a predetermined location; and
   d. electrically coupling said ionization path to ground.

2. The method of claim 1 further including producing said beam at a harmonic frequency from said laser.

3. The method of claim 2 wherein said laser is a Neodymium-glass laser, including the step of causing fourth harmonic generation from said laser.

4. The method of claim 1 wherein said step (c) includes establishing said ionization path in a time shorter than that required for evolution of significant laser beam self-extinction.

5. The method of claim 1 wherein said step (c) includes establishing said ionization path at least one-tenth kilometer in length.

6. The method of claim 1 wherein said step (b) further includes sensing the probable location of said stepped leader and aiming said laser beam at said location.

7. The method of claim 1 including the step of mounting said laser on or in a mobile vehicle.

8. The method of claim 7 including the step of mounting said laser on or in an aircraft.

9. The method of claim 1 including the further step of impeding the conduction of electrical current from said ionization path to said laser so as to protect said laser from lightning-caused damage.

* * * * *

UNITED STATES PATENT AND TRADEMARK OFFICE
CERTIFICATE OF CORRECTION

PATENT NO. : 4,017,767
DATED : April 12, 1977
INVENTOR(S) : Leonard M. Ball

It is certified that error appears in the above-identified patent and that said Letters Patent are hereby corrected as shown below:

Col. 1, line 32 Change "Vol. 63" to --Vol. 68--.

Col. 3, line 35 After "optical" add the word --frequency--;

Col. 3, line 43 After "air" delete the word --in--.

Col. 4, line 3 After "22" add a percent sign (%);

Col. 5, line 30 After "dye," delete the word --a--;

Col. 5, line 34 Change "respective" to --representative--.

Col. 7, line 48 Change "311-315" to --314-315--.

Col. 8, line 26 Change "interlocks" to --interlock--;

Col. 8, line 61 Change "FIGS." to --FIG.--.

Col. 10, line 12 Change "FIg." to --FIG.--;

Col. 11, line 43, Change filler" to --filter--;

Col. 11, line 50 Change "wich" to --which--;

UNITED STATES PATENT AND TRADEMARK OFFICE
CERTIFICATE OF CORRECTION

PATENT NO. : 4,017,767
DATED : April 12, 1977
INVENTOR(S) : Leonard M. Ball

It is certified that error appears in the above-identified patent and that said Letters Patent are hereby corrected as shown below:

| | | |
|---|---|---|
| Col. 11, | line 60 | After "23" insert the word --which--. |
| Col. 12, | line 31 | Change "for" to --from--; |
| Col. 12, | line 43 | After "to" insert the word --be--; |
| Col. 12, | line 55 | Change "cel" to --cell--. |
| Col. 15, | line 5 | After "vehicle" add a comma (,); |
| Col. 15, | line 31 | Change "surfface" to --surface--; |
| Col. 15, | line 54 | Change "clip ring" to --slip-ring--. |

Signed and Sealed this second Day of August 1977

[SEAL]

Attest:

RUTH C. MASON
Attesting Officer

C. MARSHALL DANN
Commissioner of Patents and Trademarks